UNITED STATES PATENT OFFICE.

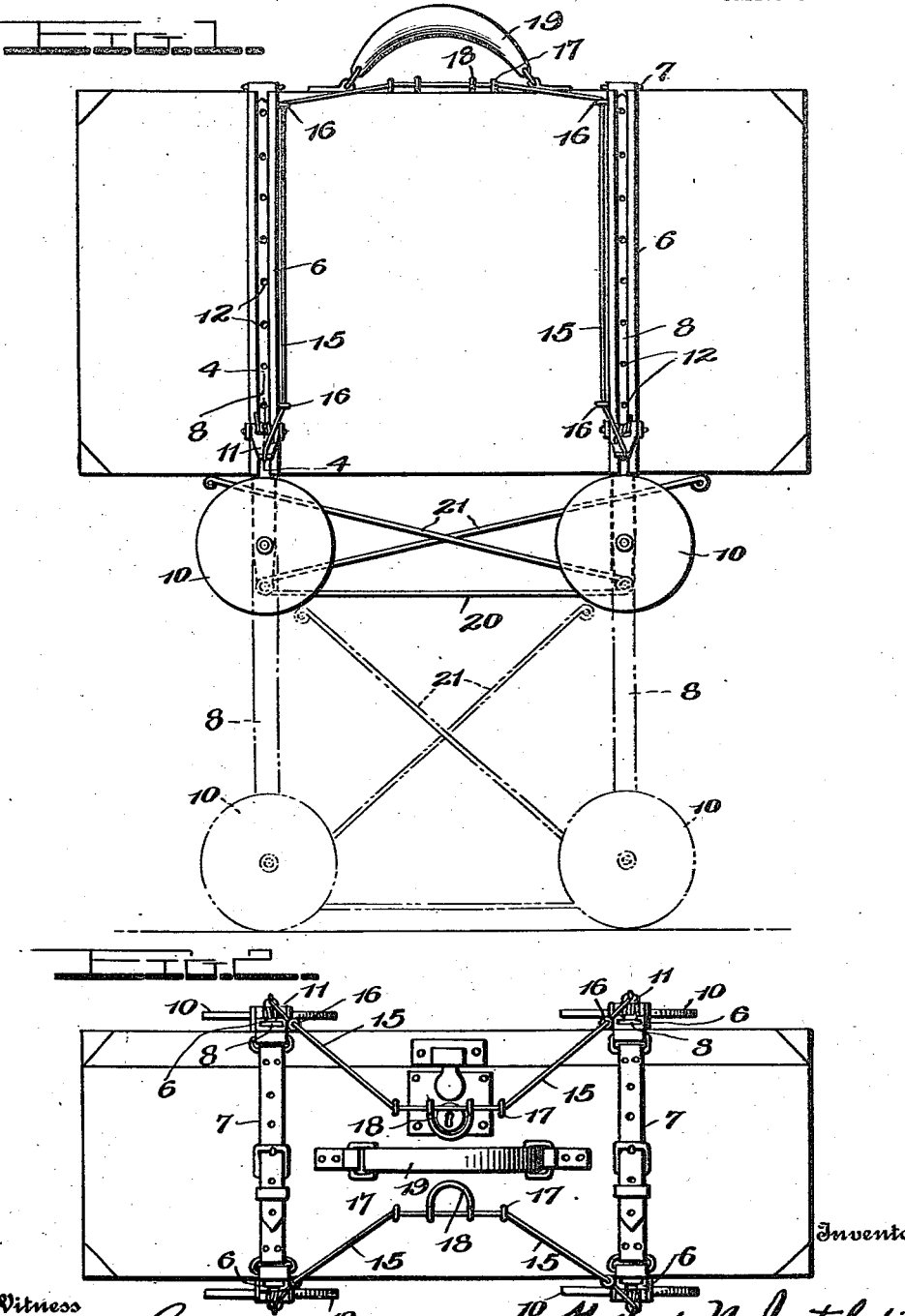

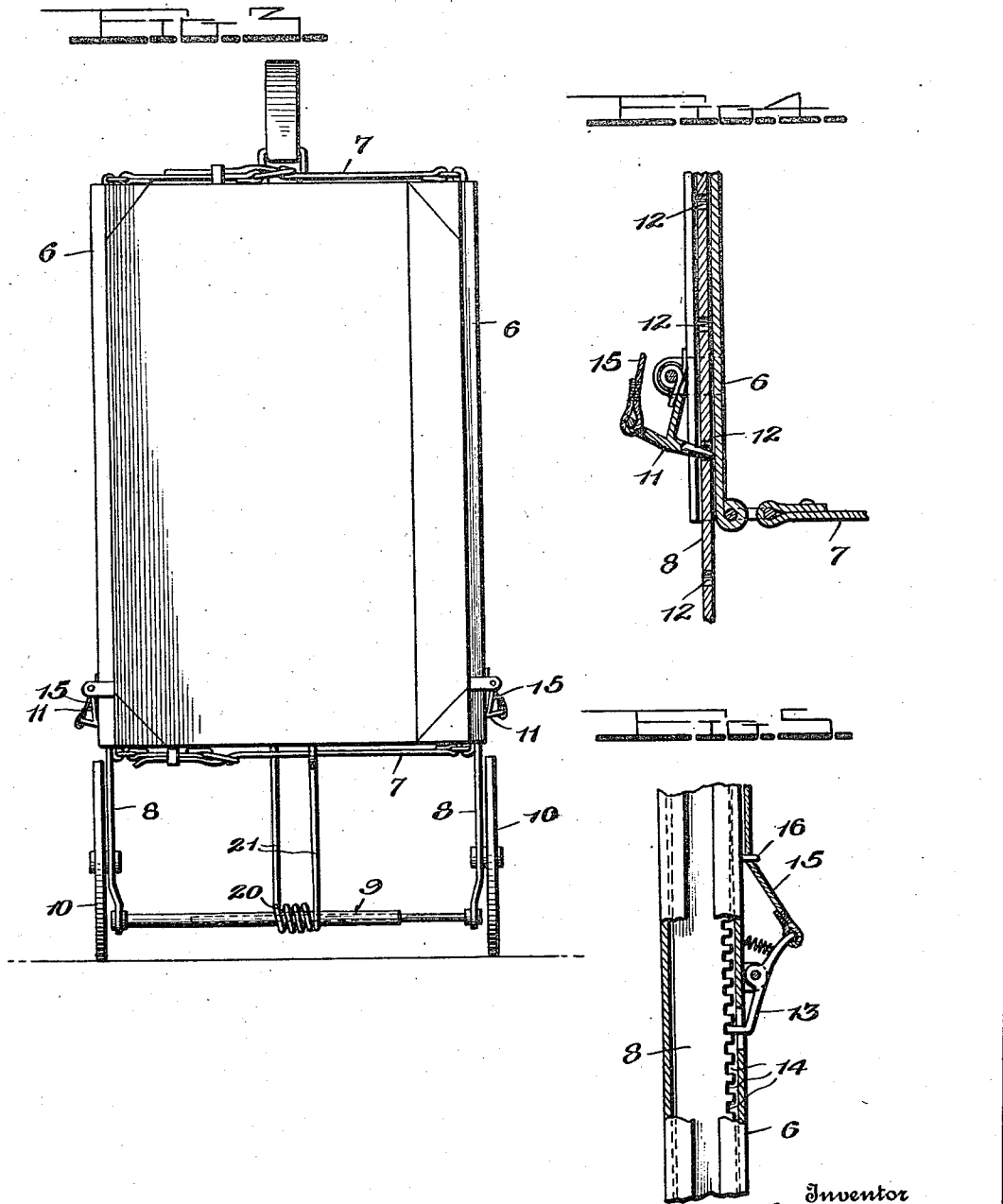

KALUSD N. VARTABEDIAN, OF CHICAGO, ILLINOIS.

HAND-LUGGAGE CARRIER OR TRUCK.

1,176,876.  Specification of Letters Patent.  Patented Mar. 28, 1916.

Application filed December 4, 1915. Serial No. 65,030.

*To all whom it may concern:*

Be it known that I, KALUSD N. VARTABEDIAN, a citizen of the United States of America, and a resident of Chicago, county of Cook, State of Illinois, have invented certain new and useful Improvements in Hand-Luggage Carriers or Trucks, of which the following is a full and clear specification.

The object of this invention is to provide a simple apparatus for detachable connection to a piece of hand baggage to enable the person carrying the same to occasionally relieve himself of the weight of the baggage by bringing into operation a simple wheeled frame in such manner that the baggage will rest upon the frame and may be rolled along on the wheels, as more fully hereinafter set forth.

In the drawings—Figure 1 is a side elevation of a conventional suit case provided with my apparatus; Fig. 2 is a vertical top view thereof; Fig. 3 is an end view thereof; and Figs. 4 and 5 are detail views of two forms of catches, either of which may be employed.

In carrying out my invention, I prefer employing two pairs of guide bars 6, one bar of each pair being adapted to lie against the side of a suit case or other hand baggage and be detachably secured thereto by straps 7. Mounted to slide vertically in each of these guide bars is a bar 8, and each pair of guide bars at its lower ends is connected by a telescopic rod 9. Mounted on the lower end of each bar is a wheel 10. The bars 8 are locked in their vertically adjusted position by means of a suitable catch, such as a spring-actuated pinlock device 11, shown in Fig. 4, which is adapted to enter in one of a series of holes 12 in the bar 8, or a spring-actuated pawl 13, shown in Fig. 5, which is adapted to engage rack teeth 14 formed on one edge of the bar 8. Attached to each one of these catches is a cord or wire 15 which extends up through eye 16 to a point where it may be conveniently grasped by the fingers of the hand which is carrying the luggage. As shown, I connect the two cords 15 at each side together at their upper ends and pass them through eyes 17 on top of the luggage, and at a point between these eyes 17 I attach to each pair of cords a finger loop 18 which extends inwardly toward the usual handle 19 of the luggage, so that the cords may be pulled readily by the fingers of the hand that is grasping the handle 19.

When it is desired to lower the wheels to a position where they may rest upon the ground or floor, as shown in dotted lines in Fig. 1, I simply pull upwardly on the cords 15 and thus release the latches and thereby permit the wheels and their supporting bars 8 to gravitate to the desired position, whereupon I release the cords 15 and thus allow the latches to engage the bars 8 and lock them in their lowered positions. The piece of luggage may then be rolled about in the manner of a truck or vehicle, thereby relieving the person carrying the same from the weight thereof. To bring the wheels up out of the way, as shown in full lines in Fig. 1, it is simply necessary to release the latches by pulling on the cords and allowing the weight of the suit case to push the rods 8 up into the guide bars, whereupon the latches will automatically lock them in their raised position. To facilitate the gravitation of the wheels and frame bars when the bars are released from the catches, I may arrange a suitable spring underneath the luggage. In the present instance, I have shown a wire spring 20 mounted upon the telescopic cross bars 9 having upwardly springing arms 21 adapted to bear against the bottom of the luggage and thus tend to press the wheels and the bars downwardly.

It will be understood that I am not confined to the details of construction set forth as said details may be varied without departing from the spirit of my invention as defined in the claims appended.

Having thus described my invention, what I claim is:

1. In a device of the class set forth, two pairs of guide bars and means for detachably clamping them to the sides of a piece of luggage, a bar vertically slidable on each one of these guide bars and carrying a wheel at its lower end, means connecting the lower ends of each pair of these bars, automatic catches for locking the bars in the guideways in their adjusted positions, and means extending from the catches to near the handle of the luggage for releasing these catches.

2. In a device of the class set forth, two pairs of guide bars and means for detachably clamping them to the sides of a piece of luggage, a bar vertically slidable on each one of these guide bars and carrying a wheel at its lower end, means connecting the lower ends of each pair of these bars, automatic catches for locking the bars in the guideways in their adjusted positions, and means extending from the catches to near the handle of the luggage for releasing these catches, said means connecting the bars being adjustable as to length to enable the device to be applied to pieces of luggage of different widths.

3. In a device of the class set forth, two pairs of guide bars and means for detachably clamping them to the sides of a piece of luggage, a bar vertically slidable on each one of these guide bars and carrying a wheel at its lower end, means connecting the lower ends of each pair of these bars, automatic catches for locking the bars in the guideways in their adjusted positions, means extending from the catches to near the handle of the luggage for releasing these catches, and spring means mounted on the means connecting the bars to press against the bottom of the luggage, for the purpose set forth.

In testimony whereof I hereunto affix my signature.

KALUSD N. VARTABEDIAN.